(No Model.)
F. P. BIXLER.
STOVE OR TABLE MAT.
No. 539,114.  Patented May 14, 1895.
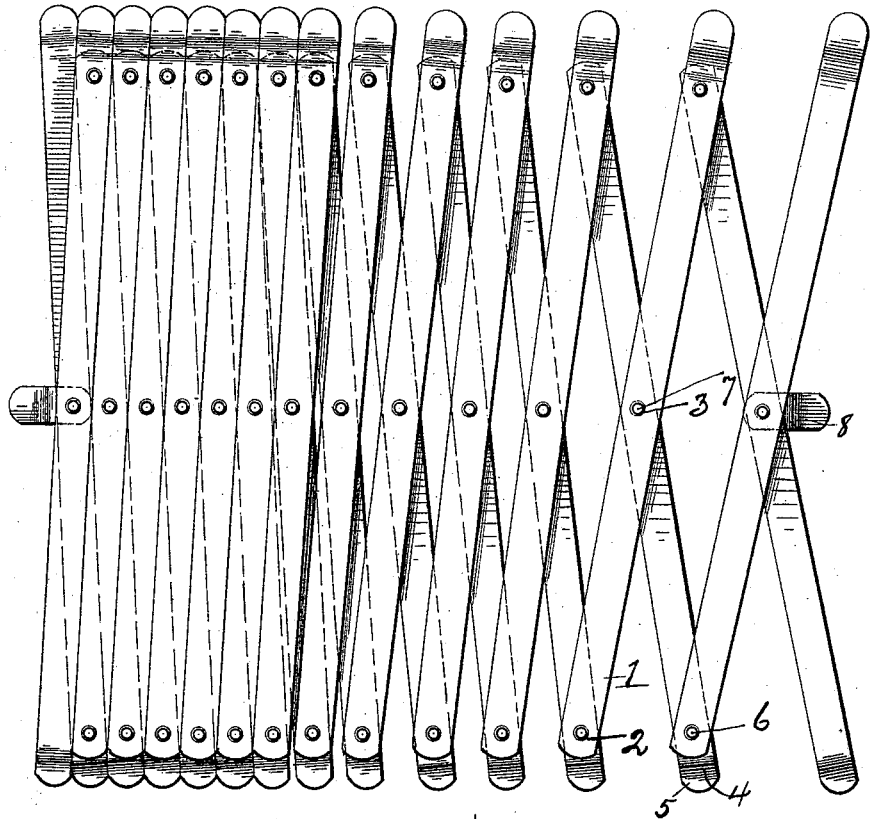
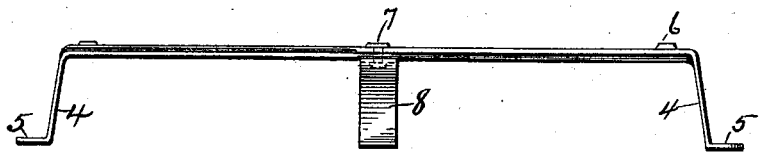
Witnesses
E. L. Reese
W. H. Pumphrey
Inventor
Frank P. Bixler
Evert Appleman
Attorneys

UNITED STATES PATENT OFFICE.

FRANK P. BIXLER, OF FREMONT, OHIO.

STOVE OR TABLE MAT.

SPECIFICATION forming part of Letters Patent No. 539,114, dated May 14, 1895.

Application filed August 10, 1894. Serial No. 519,985. (No model.)

*To all whom it may concern:*

Be it known that I, FRANK P. BIXLER, a citizen of the United States of America, residing at Fremont, in the county of Sandusky and State of Ohio, have invented certain new and useful Improvements in Stove or Table Mats, of which the following is a specification, reference being had to the accompanying drawings.

This invention relates to certain new and useful improvements in stove and table mats, and more particularly to that class capable of adjustment.

The invention has for its object to construct an article of manufacture of the above mentioned class, that will contain advantages in points of durability and cheapness to manufacture.

The invention has for its further object to provide novel means whereby the mat may be adjusted to any length desired, and its adaptability to be applied on stoves of various sizes.

The invention has for its still further object to construct a mat that will be extremely simple and effectual for the purpose of retaining culinary vessels in a heated state, without placing the same on the heated surface of the stove.

The invention finally consists in the novel construction, combination and arrangement of parts to be hereinafter more particularly described and specifically pointed out in the claim.

In describing the invention in detail reference is had to the accompanying drawings forming a part of this specification, and wherein like figures indicate similar parts throughout the several views of the drawings, in which—

Figure 1 is a plan view of my improved stove-mat, showing the same contracted, with one end partly extended; and Fig. 2 is an end view of the same.

In the drawings, 1, indicates the flat rod, provided with apertures 2, at its free ends and a central aperture 3. The rod 1, is further provided with a leg or standard 4, at one end which is formed integral with the rod and bent at right angles thereto. Near the end of said leg the rod is again bent outwardly at right angles forming a support, 5. Rivets 6, serve to connect the ends of the rods together, and are centrally pivoted by means of rivets 7. Supplemental legs or supports 8, are pivotally secured centrally at the end of the mat, thus obtaining a more substantial support and preventing the mat from sagging when carrying heavy vessels and the like. The mat may be made of any suitable material, but is preferably formed of metallic strips of the desired dimensions.

It will be noted also, that this mat may be used in ovens, to support articles in baking to prevent burning at the bottom. Furthermore, it may be used and is intended for supporting heated vessels and other articles upon tables and the like to prevent injury.

Having fully described my invention, what I claim as new, and desire to secure by Letters Patent, is—

A stove or table mat composed of a series of pairs of crossed and pivoted strips arranged in a horizontal plane, each of the said strips being bent at one end to form a foot, and the lower strip and upper strip of each pair being respectively pivoted to the upper and lower strips of the succeeding pair of strips, at the ends.

In testimony whereof I affix my signature in presence of two witnesses.

FRANK P. BIXLER.

Witnesses:
JAMES H. FOWLER,
J. YOUNGMAN.